United States Patent [19]
Milbrath et al.

[11] Patent Number: 6,166,371
[45] Date of Patent: Dec. 26, 2000

[54] DIFFUSE REFLECTIVE LIGHT CURTAIN SYSTEM

[75] Inventors: Terry J. Milbrath, Pittsboro; Jonn R. Hitch; Joe C. Hlebasko, both of Indianapolis, all of Ind.; Steven H. Mersch, Germantown, Ohio

[73] Assignee: Beckman Coulter, Inc., Fullerton, Calif.

[21] Appl. No.: 09/302,333

[22] Filed: Apr. 30, 1999

[51] Int. Cl.$^7$ .............................. G06M 7/00; H01J 40/14
[52] U.S. Cl. .......................................... 250/221; 340/556
[58] Field of Search .................................... 250/221, 553; 340/555, 556, 557

[56] References Cited

U.S. PATENT DOCUMENTS

| | | | |
|---|---|---|---|
| 3,692,980 | 9/1972 | Getker et al. | 235/92 PK |
| 3,692,985 | 9/1972 | Kalman | 235/92 PK |
| 3,841,766 | 10/1974 | Walter | 356/256 |
| 3,875,403 | 4/1975 | Svensson | 250/209 |
| 4,015,122 | 3/1977 | Rubinstein | 250/221 |
| 4,052,120 | 10/1977 | Sick et al. | 350/6 |
| 4,070,940 | 1/1978 | McDaniel et al. | 83/464 |
| 4,107,522 | 8/1978 | Walter | 250/221 |
| 4,127,771 | 11/1978 | Sick | 250/221 |
| 4,139,766 | 2/1979 | Conway | 235/92 PK |
| 4,156,883 | 5/1979 | Walter et al. | 361/177 |
| 4,239,961 | 12/1980 | Lasar | 250/221 |
| 4,250,062 | 2/1981 | Kaiser | 252/522 R |
| 4,281,765 | 8/1981 | Brazell et al. | 209/576 |
| 4,308,959 | 1/1982 | Hoover et al. | 209/563 |
| 4,402,609 | 9/1983 | Fetzer et al. | 356/387 |
| 4,408,195 | 10/1983 | Tullis et al. | 340/685 |
| 4,528,680 | 7/1985 | Archambeault . | |
| 4,555,624 | 11/1985 | Steffen | 250/223 |
| 4,590,410 | 5/1986 | Jonsson | 250/221 |
| 4,645,080 | 2/1987 | Scopatz | 209/558 |
| 4,687,107 | 8/1987 | Brown et al. | 209/556 |
| 4,693,378 | 9/1987 | Azegami et al. | 209/586 |
| 4,763,903 | 8/1988 | Goodwin et al. | 250/553 |
| 4,782,500 | 11/1988 | Lyngsie | 377/6 |
| 4,864,121 | 9/1989 | Pietzsch | 250/221 |
| 4,868,901 | 9/1989 | Kniskern et al. | 250/222.2 |
| 4,875,761 | 10/1989 | Fetzer | 350/171 |
| 5,015,840 | 5/1991 | Blau | 250/221 |
| 5,080,457 | 1/1992 | Fetzer et al. | 359/208 |
| 5,198,661 | 3/1993 | Anderson et al. | 250/221 |
| 5,218,196 | 6/1993 | Dogul et al. | 250/221 |
| 5,266,793 | 11/1993 | Smith | 250/214 A |
| 5,280,622 | 1/1994 | Tino | 395/90 |
| 5,281,809 | 1/1994 | Anderson et al. | 250/221 |
| 5,302,942 | 4/1994 | Blau | 340/556 |
| 5,404,008 | 4/1995 | Malinowski et al. | 250/222.1 |
| 5,412,553 | 5/1995 | Wojski | 362/253 |
| 5,486,691 | 1/1996 | Dieterle | 250/221 |
| 5,539,198 | 7/1996 | McMichael et al. | 250/221 |
| 5,874,898 | 2/1999 | Peralta et al. | 340/556 |
| 5,977,878 | 11/1999 | Lang | 250/221 |

Primary Examiner—F. L. Evans
Attorney, Agent, or Firm—William H. May; Margaret A. Kivinski; Ice Miller Donadio & Ryan

[57] ABSTRACT

A Diffuse Reflective Light Curtain System comprises at least one light curtain defining a border of a work zone for a robotic machine. Each light curtain comprises a primary board having multiple wells formed therein. Light emitting diodes (LEDs) and light detectors are alternately placed in the multiple wells. The LEDs shine light up from the wells to form a curtain of light above the primary board. If an object comes into contact with the curtain of light emitted from the LEDs, the light is reflected back to toward the board and enters the wells of the board where the light detectors sense the presence of LED light. When the light detectors in the wells sense the presence of LED light, they send a signal to a controller to indicate that the light curtain has been breached by a foreign object. The controller, in turn, suspends the operation of the robotic machine that is protected by the light curtain. If multiple light curtains are used to define a plurality of work zones, sensors may be connected to the controller to determine the physical position of the robotic machine. The controller selectively enables or disables each of the light curtains based upon inputs received from the sensors to allow for foreign objects to enter particular work zones at different times during the operation of the robotic machine.

26 Claims, 3 Drawing Sheets

DIFFUSE REFLECTIVE LIGHT CURTAIN SYSTEM

BACKGROUND OF THE INVENTION

The present invention relates to the field of safety devices for industrial machinery, and particularly to light curtains used as safety devices for robotic machines.

Industrial machines which incorporate robotic movement present a safety concern when humans are required to work near the moving machinery. Should a human working near the machine become careless and come into direct contact with the moving machinery, a serious accident may occur, resulting in the loss of human life or limb. To reduce the risk of such injury, many machines utilize safety devices which block humans from coming into contact with moving machinery. These safety devices often take the form of physical enclosures, such as plexiglass walls, which completely block the entry of objects into the machine's working space defined by the physical enclosure. While these physical enclosures properly prevent the entry of foreign objects into the machine's working space, there are several disadvantages to such physical enclosures. First, physical enclosures add substantially to the total cost of the robotic machine because of additional engineering time required to design an effective enclosure and additional materials required to build the physical enclosures. Next, physical enclosures often impede the vision of human operators into the working space of the machine. For example, even if a transparent plexiglass is used for a portion of the physical enclosure, the plexiglass may become scratched or clouded, or a glare may reflect from the plexiglass, thus impeding vision. Further, physical enclosures prevent entry of a human or a robot into the machine working space, when required. For example, a robot or human may need to enter the working space at a particular time to load parts within the machine working space. Also, if the machine is in need of repair, it is desirable for a human to have quick and easy access to the working space of the machine in order to make the repair. For these reasons, light curtain safety systems are often preferred to physical enclosures because light curtains provide a protective barrier while still allowing for clear vision into the machine working space and also allowing for quick and easy access to the machine working space when required.

Light curtains generally comprise light emitting diodes (LEDs) which direct streams of light to light detectors positioned directly opposite each LED. Light stretching from one LED to its opposing light detector may be considered a single "bar of light". If the LEDs are arranged in a row, multiple bars of light are formed within a single plane to form an invisible barrier or "light curtain". Alternatively, some light curtains use a reflective member opposite the LED to direct the bar of light to a detector positioned somewhere other than opposite the LED, such as next to the LED. When an object comes into contact with the light curtain, at least one of the bars of light is broken, and the detector associated with the broken bar of light sends a signal that the light curtain has been breached. When the machinery receives a breach signal, an alarm is triggered, and the machinery protected by the light curtain is immediately stopped. In this manner, the light curtain prevents injury to humans who accidentally breach the light curtain and enter the working space of the machine. At the same time, light curtains allow for unimpaired vision and easy access to the working space of a robotic machine.

While light curtains provide an improved safety mechanism for preventing injury, several problems remain with the use of light curtains as safety devices for robotic machines. First, light curtains may be as costly, if not more costly to design and build than physical enclosures. In order to form a "bar of light", operational elements such as LEDs, detectors, and reflective devices must be positioned on at least two sides of the light curtain. Supporting structures are also required on at least two sides of the light curtain to support the operational elements. A large cost of designing and producing a light curtain could be removed if a light curtain could be formed with operational elements and supporting structures on only one side of the light curtain.

Another problem with typical light curtains is that entry into any part of the working space of the robotic machine, as defined by the light curtain, is absolutely prohibited during operation of the machine. In many situations, it may be useful for the operator to actually enter into a particular region of the machine working space while the machine is operating. For example, it would be useful for an operator to be allowed to enter a first working area of a robotic machine to load a part on a platform while the machine works in a second area, but to be restricted from the first area as a robot approaches the platform to manipulate the part on the platform.

SUMMARY OF THE INVENTION

A light curtain safety system according to the present invention comprises a plurality of light emitters and a plurality of light detectors all positioned on a single board. The board comprises a plurality of linearly arranged wells with each well having a top portion and a bottom portion. The light emitters and light detectors are alternately placed in the bottom of the wells. The light emitters are positioned within the bottom portions of alternate wells such that light is emitted toward and out of the top portions of alternate wells. The light emitted from the wells forms a "light curtain" extending upward from the board. The light of the light curtain is near infrared light capable of being reflected by most colors.

The detectors are positioned in the bottom portions of alternate wells that do not contain light emitters. The detectors are positioned within the wells to receive and detect light entering each alternate well from the top portion of the well and propagating to the bottom portion of the well. The detectors will normally receive no light from the light emitters because they are insulated from the light emitters within different wells. However, if an object comes into contact with the light curtain, light from the light emitters is reflected back to the board and the reflected light contacts at least one of the detectors. Detection of light by one of the detectors signals a breach of the light curtain.

With this arrangement, a light curtain safety system is provided wherein a breach of a light curtain is provided upon detection of reflected light rather than the absence of light, as with other light curtain systems. Therefore, according to the present invention all elements of the light curtain, including light emitters, light detectors, or any reflection devices may all be positioned on a single side of the light curtain. By placing the parts required for the entire light curtain safety system on a single side of the light curtain, the design costs and material costs of the system may be greatly reduced, and I a cheaper yet effective light curtain is provided.

The light curtain safety system of the present invention may be expanded to include multiple boards and multiple light curtains. Connectors are provided on each board so that light curtains of various sizes and shapes may be defined with multiple boards. For example, a long straight light curtain may be formed by connecting multiple boards along a single line, or an area may be completely enclosed by shaping a square light curtain. Thus, various zones of protection may be provided by connecting multiple boards to define the shape of the light curtain.

The zone of protection provided by the light curtain is defined not only by the connection of the boards defining the shape of the light curtain, but also by the voltage supplied to the light emitters. Because the light curtain has no physical upper boundary, the upper boundary is defined by the distance from the light emitter at which the emitted light will no longer reflect back to the board at an intensity sufficient to allow the detectors to detect the light. When a large voltage is supplied to the light emitters, the light will be intense at distances relatively far from the light emitters and will sufficiently reflect back to the board to allow light detection by the detectors. If a smaller voltage is supplied to the light emitters, light of sufficient intensity for detection will reflect back to the board only at shorter distances. Thus, the upper physical boundary of the light curtain is controlled by the voltage supplied to the light emitters.

If a light curtain safety system is desired wherein an operator may enter a portion of a robotic machine's working space during designated times of machine operation, such as a loading stage, multiple light curtains may be used to define various zones within the working space of the machine. A first light curtain may define a zone where objects may never enter, while a second light curtain may protect a loading dock that may be entered only at certain times. A controller is used to determine when the second light curtain is activate or inactive. For example, the second light curtain may be inactive while the robot is positioned entirely in the zone protected by the first light curtain. This will allow a human to load parts on to the dock located in the zone protected by the second light curtain. When the robot moves into the zone protected by the second light curtain, the second light curtain is activated, and any object breaching the light curtain at that time will immediately cause an alarm to signal and cause the machine to turn off. In this manner, the light curtain safety system of the present invention protects the operator of a robotic machine by allowing access to certain areas of the machine at selective times, but denying access to those same areas of the machine at other selective times.

Accordingly, it is an advantage of the present invention to provide a light curtain safety system wherein a breach of a light curtain is provided upon detection of reflected light rather than the absence of light, thus allowing for borders of the light curtain to be defined by hardware provided on only a single side of the light curtain and thereby reducing design costs and material costs associated with the light curtain safety system.

It is a further advantage of the present invention to provide a light curtain safety system that defines several work zones in relation to one robotic machine and selectively allows entry into certain work zones and prevents entry into those work zones at different times during normal operation of the robotic machine.

It is another advantage of the present invention to provide boards for building a light curtain safety system wherein the boards may be easily assembled and controlled to form light curtains of various shapes and sizes.

DETAILED DESCRIPTION

Figure 1:
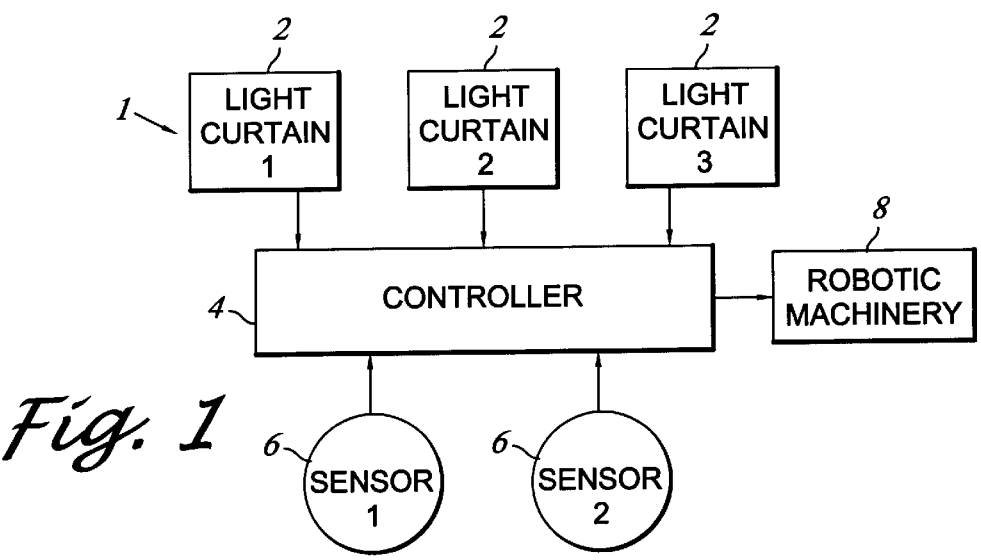
FIG. 1 shows a block diagram overview of a diffuse reflective light curtain system.

As shown in FIG. 1, a Diffuse Reflective Light Curtain System 1 comprises at least one light curtain 2 connected to a controller 4. The light curtain 2 is capable of emitting light and receiving reflected light back from an object that comes into contact with the light curtain's emitted light. Upon the detection of light that has been reflected from an object contacting the light curtain, the light curtain is capable of signaling the controller that the light curtain has been breached. If the light curtain has been breached, an intrusion alarm (not shown) will be activated by the controller. A plurality of sensors 6 are also connected to the controller 4. The sensors 6 are operable to determine a state of a robotic machine 8, such as the physical position of the machine 8. The controller 4 selectively enables or disables each of the light curtains 2 based upon inputs received from the sensors 6. If an enabled light curtain 2 signals that the light curtain 2 has been breached by a foreign object, the system will immediately suspend operation of robotic machine 8 protected by the light curtain 2.

Figure 2:
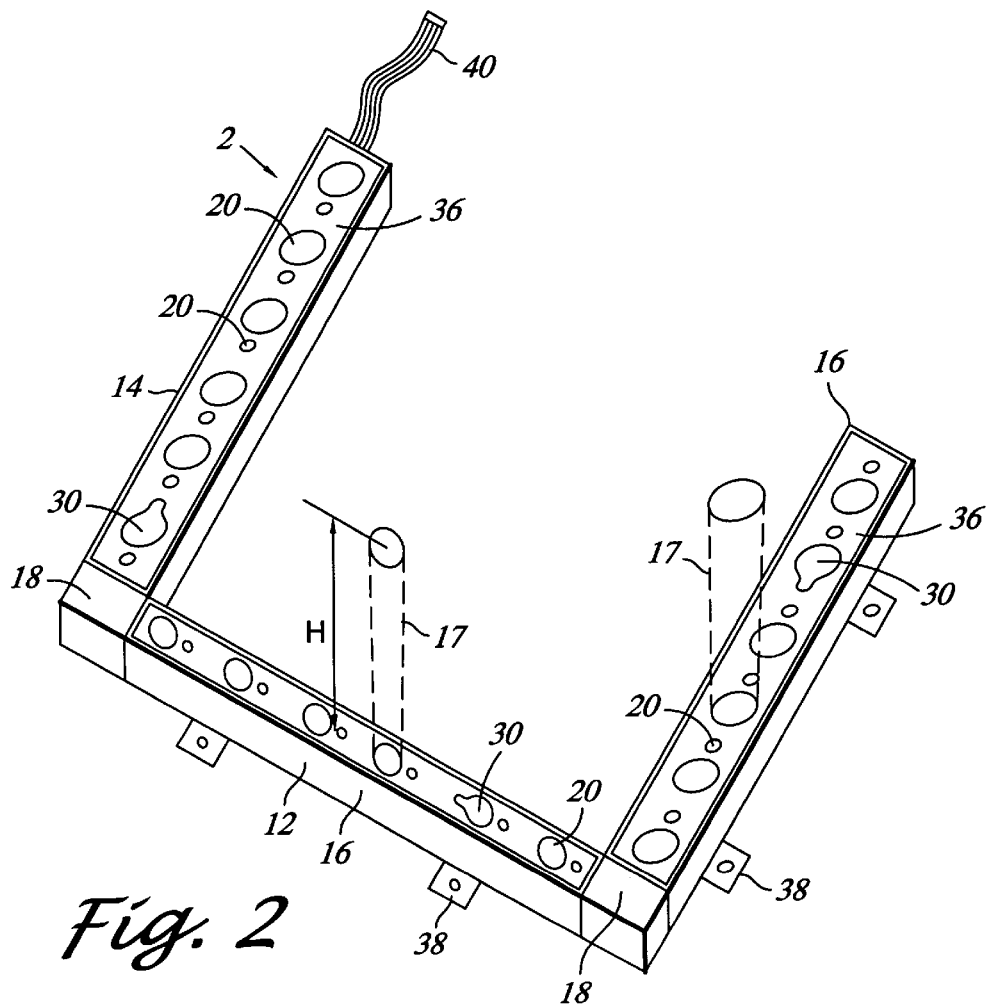
FIG. 2 shows a perspective view of a light curtain frame according to the present invention.
Figure 5:
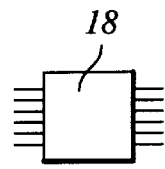
FIG. 5 shows a top view of a connector of the light curtain frame of FIG. 2.

As shown in FIG. 2, each fight curtain 2 comprises a light curtain frame 12. The light curtain frame 12 includes a primary board 14 made of phenolic or a plastic material. The primary board 14 includes multiple wells 20 formed therein, with each well 20 containing an opening 26, a sidewall 27 and a bottom 28. A plurality of secondary boards 16 may be connected to the primary board 14 to form the light curtain frame 12. The secondary boards are also made of phenolic and also have multiple wells 20 formed therein. Connectors 18 are used to connect the primary board 14 to one of the secondary boards 16. Connectors 18 are also used to connect secondary boards 16 to each other. The connectors 18 join the boards in a linear fashion or at an angle, such as a right angle where the boards are perpendicular. As shown in FIG. 5, the connectors include two sides with male connection pins 19 extending therefrom. A total of twelve male connection pins are included on each connector, with six connection pins positioned on each of the two sides.

Figure 3:
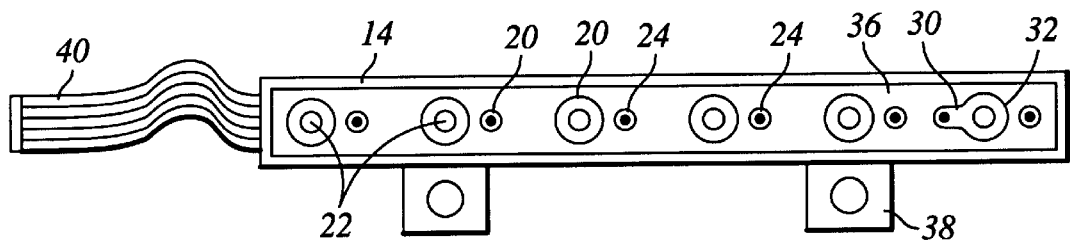
FIG. 3 shows a top view of a primary board of the light curtain frame of FIG. 2.
Figure 4:
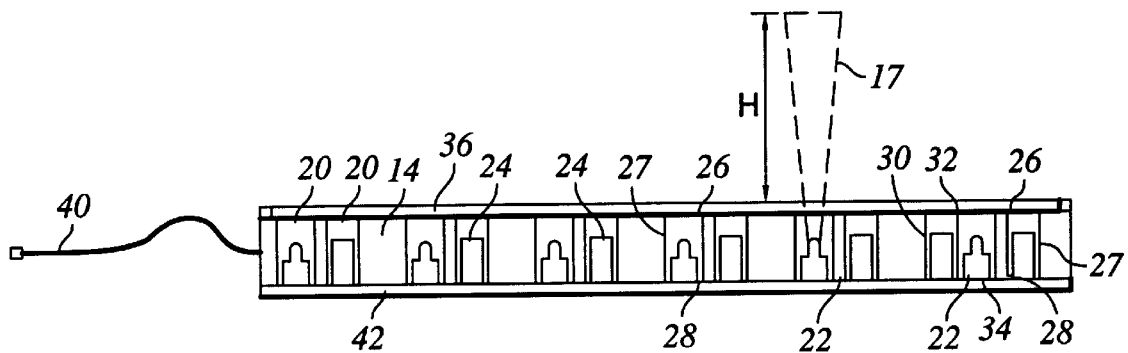
FIG. 4 shows a side cross-sectional view of the primary board of FIG. 3.

As shown in FIGS. 3 and 4, six light emitters 22 such as light emitting diodes (LEDs) 22, which may be, for example, Siemens part no. SFH 485, are positioned within alternative wells 20 on the primary board 14. The LEDs 22 are positioned in the well bottoms 28, and are oriented to emit light 17 upward and out of the well openings 26. Light emitted from a well opening may be considered to be a "bar of light" 17. Each bar of light 17 has a small diameter near the well openings and gradually increases in diameter farther away from the well opening. The light emitted from the LEDs 22 is infrared or near infrared light 17 capable of reflecting off of various objects and returning to the frame with sufficient intensity for detection by light detectors 24, which may be, for example, Hamamatsu part no. 54289-61. For example, the LEDs 22 may emit at a peak wavelength of 880 nm with a spectral bandwidth of +/−40 nm measured at the half power points. The light 17 transmitted by the LEDs is modulated, and the detection of the light is optically and electronically filtered such that only LED 22 light is sensed by the detectors 24.

The sensitivity or useful height H of the light curtain 2 defines a border of the light curtain and is the height above the board at which objects may contact the emitted light 17 such that a sufficient amount of light reflects back to the board to allow detection of reflected light by the detectors. The amount of light that will be reflected back to the board by an object at a particular height above the board is dependant on both the reflectivity of the object and the intensity of the light 17 emitted from the LEDs 22. While the reflectivity of the object invading the light curtain can not always be controlled, the intensity of the light 17 emitted from the LEDs can be controlled. Accordingly, the useful height H of the light curtain is increased as the intensity of the light emitted from the LEDs is increased. The intensity of the light emitted from the LEDs is controlled by determining the voltage supplied to the LEDs. As more voltage is supplied to the LEDs, more light is emitted from the LEDs 22, and the height of the light curtain's protected space increases. Voltage to power the LEDs is supplied to the light curtain through the controller 4. Depending upon the design of the system 1, the voltage may be fixed or may be manually adjusted by inputs from a human operator to define the useful height of the light curtain 2. For example, a potentiometer may be provided that adjusts the voltage supplied by the controller, thereby allowing a human operator to manually adjust the useful height of the light curtain. The means for adjusting the voltage may be provided by turning a screw, pushing a button, flipping a switch, entering a voltage value on a keyboard, or other similar means. In one embodiment, the supply voltage may be varied from 16–22 V.

Seven light detectors 24 are positioned on the primary board within wells 20 next to those wells containing LEDs 22. The light detectors 24 are situated in the well bottoms 28 and are oriented to receive light entering the well through the well openings 26. Six of the seven light detectors 24 on the primary board are completely insulated from light being emitted from the LEDs because they are situated in separate wells 20 from the LEDs. However, one of the light detectors is positioned in a dual well 30, and shares the dual well 30 with an LED. The dual well has an enlarged well opening 32 and holds both an LED 22 and a light detector 24 in the well bottom 34.

A lens 36 is held by the board above the well openings 26 to act as a light filter and to provide a protective covering for the LEDs 22 and detectors 24. The lens 36 filters certain types of light from entering the wells while allowing light emitted by the LEDs to freely enter and exit the wells. For example, the lens may be made of an acrylic r002 red material that passes infrared light and filters non-infrared light. At the same time, the lens 36 prevents dust and debris from entering the wells and blocking the transmission of light by the LEDs or the detection of reflected light by the light detectors.

Figure 6:
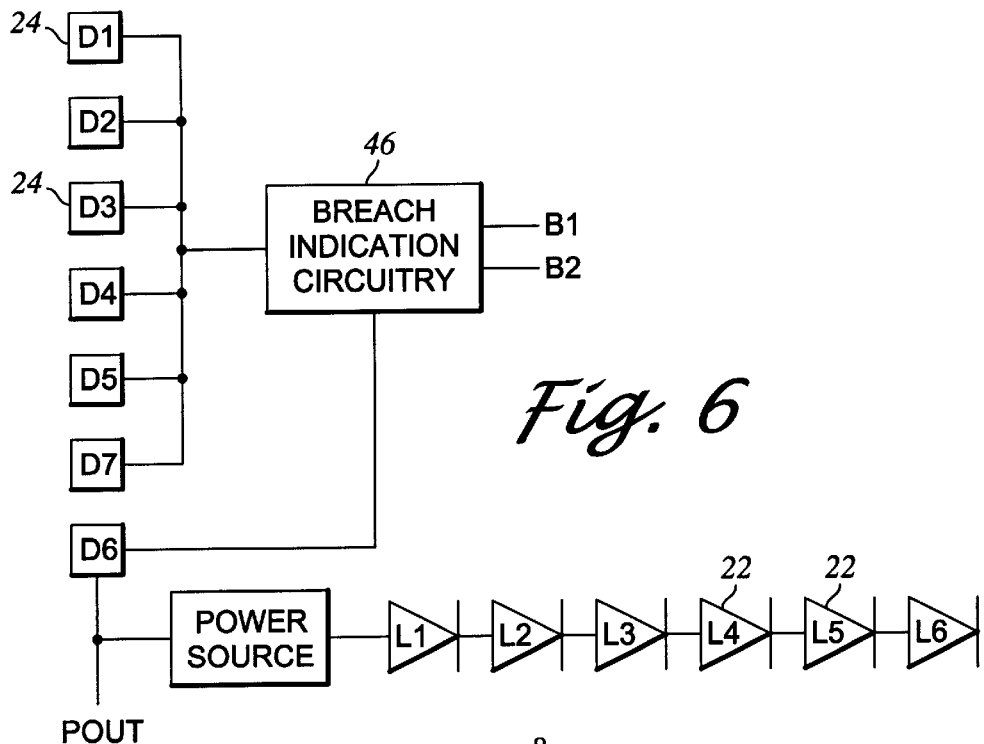
FIG. 6 shows a block diagram of the connections provided by an integrated circuit board located on the primary board of FIG. 2.

A first integrated circuit (IC) board 42 having breach indication circuitry 46 (see FIG. 6) for interaction with the light detectors 24 is positioned under the bottoms 28 of the wells of the primary board 14. A block diagram showing an overview of the connections provided by the first IC board 42 is shown in FIG. 6. The first IC board 42 provides connections from the seven light detectors of the primary board, shown on FIG. 6 by D1–D7, to breach indication circuitry 46 included on the first IC board 42. The breach indication circuitry 46 receives inputs from the detectors and is operable to generate two redundant breach signals, B1 and B2, for submission to the controller 4 to indicate either a breach of the light curtain or a faulty light curtain. D6 is the detector that is positioned within the dual well 30 of the primary board and has a separate connection to the breach indication circuitry than that of the other detectors. D6 also provides an electrical pulse signal, POUT, sent to a power source which provides power to light the LEDs 22 of the primary board, shown in FIG. 6 by L1–L6. The electrical pulse signal generated by D6 modulates the light emitted by the LEDs 22 at a specific frequency.

As shown in FIGS. 3 and 4, input leads 40 are provided on the primary board to connect the first integrated circuit board 42 to the controller 4. The input leads include five elongated conductors that and extend from one end of the primary board 14 at the integrated circuit board 42 to the controller 4. On an opposite end of the primary board 14 from the input leads 40 is a jack (not shown) having six female pins. The six female pins may be mated with male pins from one of the connectors 18. If the connector 18 is also joined to one of the secondary boards 16, the connector will physically and electrically connect the primary board 14 to the secondary board 16.

The secondary boards 16 (see FIG. 1) include wells 20, LEDs 22, and detectors 24 positioned the same as those on the primary board 14. The secondary boards also include an integrated circuit board that is similar to the first IC board 42 of the primary board, with the exception that the sixth detector does not generate a pulse signal. Instead, each of the secondary boards 16 utilize the POUT signal generated by the sixth detector on the primary board 14 to modulate the light emitted by the LEDs. Unlike the primary board 14, the secondary boards 16 do not include input leads 40. Instead, both ends of the secondary boards 16 have jacks with six female pins (not shown). The male pins of the connectors 18 may be mated with the female pins of the jacks to physically and electrically connect two secondary boards or to connect one of the secondary boards 16 to the primary board 14. In this manner, multiple boards 14 and 16 may be joined together to form a single frame 12 for a large light curtain.

Mounting tabs 38 are included on the primary board 14 and secondary boards 16 so the primary board may be secured to machinery to be protected by the light curtain system 1. The mounting tabs 38 are two plastic tabs extending from each board with holes formed therein. Screws, nails, rivets or other fastening devices may be placed through the holes and inserted into the machine or structure near the machine to secure the mounting tabs and hold the frame 12 in place. Once mounted, the light curtain frame defines the base of a space that will be protected by the system 1. Light emitted from the LEDs 22 during operation of the system 1 forms at least one complete light curtain that surrounds the protected space.

In operation, the Diffuse Reflective Light Curtain System 1 is used to prevent a foreign object from entering the working space of a robotic machine 8. With reference to FIGS. 1, 2 and 6, LEDs 22 within wells 20 on the primary and secondary boards 14 and 16 emit near infrared light 17 vertically upward from the wells 20 to form a light curtain 2 around the protected space. The system 1 allows the robotic machine to move and perform its normal operations within the protected space defined by the light curtain 2. Should an invading object come into contact with the light of the light curtain, light will be reflected from the object and back toward the wells 20. When the detectors 24 in the wells sense the near infrared light that has been reflected from the invading object, the detectors send a signal to the breach identification circuitry 46. The breach identification circuitry 46 processes the signal and produces two redundant breach signals (or "detection signals"), B1 and B2, which are sent to the controller 4 to indicate that a breach of the light curtain has occurred. The redundant breach signals B1 and B2 provide a safety means to guard against one of the breach signals not properly signaling a breach. Upon receipt of either breach signal, B1 or B2, the controller 4 sends a signal to an intrusion alarm. The intrusion alarm (not shown) may be an audio alarm such as a horn, a visual alarm such as a light, a physical result such as stoppage of movement in the robotic machine, or any other such alarm deemed necessary and useful for the particular application. In this manner, serious injuries to human limbs are prevented.

The Diffuse Reflective Light Curtain System also produces a fault signal should the security of the light curtain be compromised by faulty LEDs. As shown in FIG. 6, the LEDs on each board 14 are all connected in series. If any one of the LEDs 22 on the board burns out, the LED branch of the circuit will be opened and all of the LEDs will fail to emit light for that board. When any one of the boards fails to emit light, a large open area exists in the light curtain, and the security of the light curtain is be compromised. To detect this situation where one of the light curtain boards fails to emit light, the dual well 30 on each board contains a detector D6 as well as a light emitting diode L6. As L6 emits light, the light will be reflected off of the sidewall 27 of the dual well and sensed by detector D6. If D6 detects the presence of light emitted by L6, all LEDs on the board may be assumed to be in working condition and emitting light. If L6 fails to emit light, D6 will not detect the presence of light within the dual well 30, and a faulty board exists. D6 provides a signal to the breach indication circuitry 46 to indicate the presence or absence of light emitted by L6. Based upon the signal received from D6, the breach indication circuitry determines whether the board is faulty or properly emitting light. If the board is faulty, the redundant breach signal, B1 and B2, is sent to the controller and the controller immediately signals the intrusion alarm which provides an indication of the breach such as an immediate stop in the robotic machinery because the security of the light curtain has been compromised.

The system 1 is capable of selectively operating up to five light curtains. As mentioned above, each light curtain contains at least one primary board and may also contain multiple secondary boards. Each respective light curtain may be designed to cover a particular boundary. The system 1 is capable of selectively turning on or off any one light curtain defining a particular boundary. In this manner, a human operator may be permitted to enter a particular work area during a certain machine step, but may be restricted from that same area during another machine step.

Figure 7:
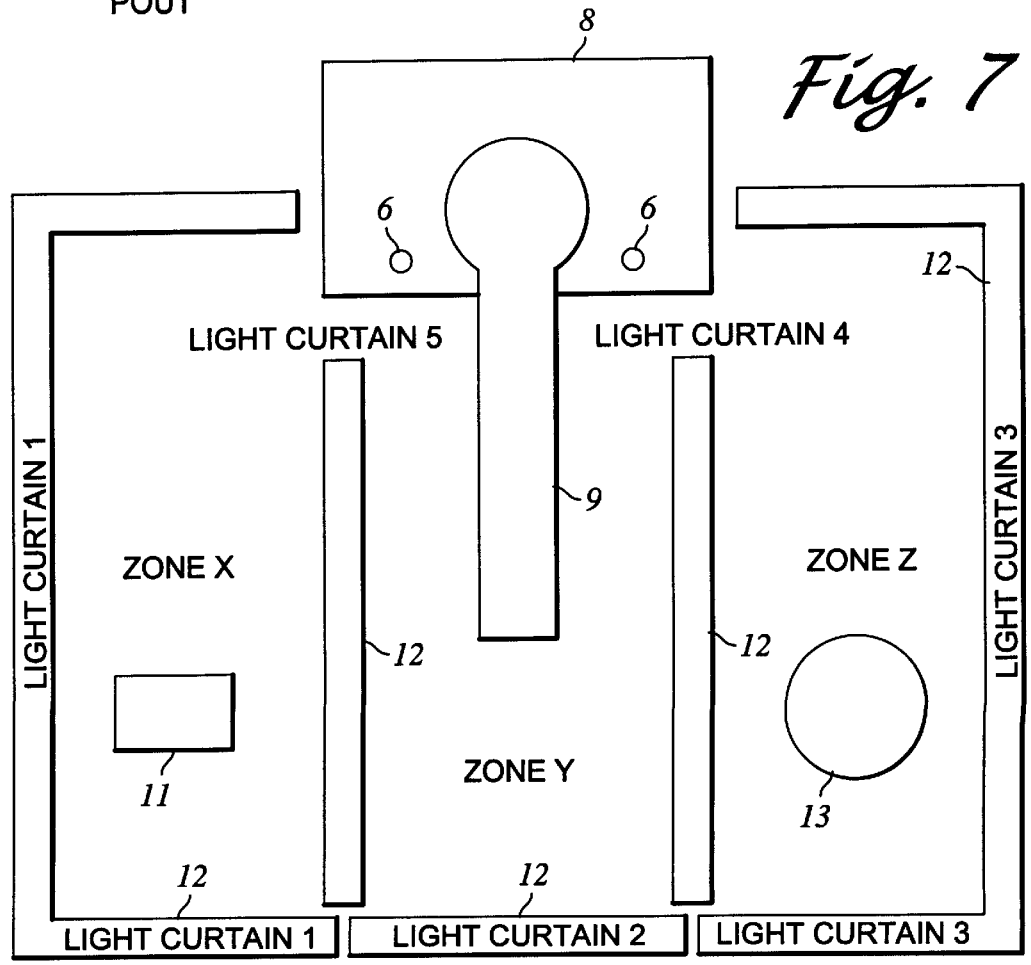
FIG. 7 shows a plurality of light curtains according to the present invention wherein the plurality of light curtains define a plurality of work zones.

An exemplary multiple light curtain arrangement is shown in FIG. 7. Five light curtain frames 12 of various shapes are arranged to form a protected space having three zones. Zone X is defined by light curtains 1 and 5, Zone Y is defined by light curtains 5, 2 and 4, and Zone Z is defined by light curtains 4 and 3. A robotic machine 8 having a moving arm 9 is situated in the proximity of the light curtains 12, such that the moving arm 9 is capable of moving into Zone X, Zone Y or Zone Z.

Light curtain 1 is initially disabled by the controller to allow a human operator to reach into Zone X during a loading stage and place a part on a platform 11. During the loading stage, light curtains 2, 3, and 5 are all enabled to prevent entry of an invading object into Zone Y or Zone Z as the robotic machinery works in those areas. When the sensor 6 detects that the arm 9 is about to enter Zone X, light curtain 5 is disabled to allow the robotic machine to enter Zone X. At the same time, light curtain 1 is activated to prevent any objects such as a human limb from being in Zone X during the time that the robotic machine operates in Zone X. When the robotic machine enters Zone X, light curtain 3 may be disabled, while light curtains 1, 2 and 4 are active. This arrangement provides for entry of an object into Zone Z for removal of a part from a dock 13, while preventing entry of an object in Zone X or Zone Y where the robotic machine continues to operate.

Those of skill in the art will appreciate that many changes could be made to the embodiments described herein without departing from the spirit and scope of the inventions. By way of example, a light emitter could be a single light source configured as disclosed in U.S. Pat. No. 4,875,761, an elongated lamp positioned adjacent to a plurality of light detectors, a fiber optic rod with a sawtooth mirror such as that disclosed in U.S. Pat. No. 4,052,120, or a strip-like concave mirror such as that disclosed in U.S. Pat. No. 4,864,121. Additional changes will be readily apparent to those of skill and the art, and the invention, as described in the claims, should not be limited to the embodiments shown.

What is claimed is:

1. A light curtain system for detecting entry of an object into a protected space having a first boundary and an opposite boundary defining an entry into the protected space, the light curtain system comprising:
   a. a robotic machine operable to move within the protected space;
   b. at least one light emission device positioned on the first boundary of the entry into the protected space and projecting light toward the opposite boundary of the entry into the protected space;
   c. a plurality of light detection devices positioned on the first boundary of the protected space, the plurality of detection devices for detecting light reflected from the object entering the protected space; and
   d. an intrusion alarm operable to suspend operation of the robotic machine upon detection by at least one of the plurality of detection devices of light reflected from the object entering the protected space.

2. The light curtain system of claim 1 wherein the at least one light emission device comprises a plurality of light emission devices arranged to define at least a first protected zone and a second protected zone within the protected space.

3. The light curtain system of claim 2 further comprising a controller operable to selectively activate or deactivate each of the plurality of light emission devices, thereby allowing the object to enter the first protected zone without operation of the intrusion alarm while restricting the object from the second protected zone by operating the intrusion alarm upon entry into the second protected zone.

4. The light curtain system of claim 3 further comprising a primary board wherein light emission devices and light detection devices are positioned upon the primary board.

5. The light curtain system of claim 4 further comprising at least one secondary board connected to the primary board wherein light emission devices and light detection devices are positioned upon the at least one secondary board.

6. The light curtain system of claim 4 wherein the primary board comprises a plurality of wells such that light emission devices and light detection devices are alternately positioned within the plurality of wells.

7. The light curtain system of claim 5 wherein the at least one secondary board comprises a plurality of wells such that light emission devices and light detection devices are alternately positioned within the plurality of wells.

8. The light curtain system of claim 5 further comprising at least one connector for connecting the primary board to the at least one secondary board.

9. The light curtain system of claim 8 wherein the primary board may be connected to the at least one secondary board in a linear fashion.

10. The light curtain system of claim 8 wherein the primary board may be connected to the at least one secondary board at an angle.

11. The light curtain system of claim 8 wherein the at least one secondary board comprises multiple secondary boards and the at least one connector comprises multiple connectors, and each secondary board is connected to another secondary board by a connector.

12. The light curtain system of claim 11 wherein the secondary boards may be connected to each other in a linear fashion.

13. The light curtain system of claim 11 wherein the secondary boards may be connected to each other at an angle.

14. The light curtain system of claim 6 wherein one of the plurality of wells contains both a light emission device and a light detection device.

15. The light curtain system of claim 1 wherein an electrical voltage is supplied to the at least one light emission device and the at least one light emission device projects light toward the opposite boundary of the entry into the protected space for a useful distance, the useful distance being dependent upon the electrical voltage supplied to the at least one light emission device.

16. The light curtain system of claim 15 further comprising a means for adjusting the electrical voltage supplied to the at least one light emitter.

17. A light curtain comprising:
   a. a primary board having at least three wells, each well including a well opening and a well bottom,
   b. a first light detector positioned within a first of the plurality of wells, the light detector oriented to receive light entering the well through the well opening;
   c. a first light emitter positioned within a second of the at least three wells, the light emitter oriented to emit light through the well opening;
   d. a second light detector and a second light emitter both positioned within a third of the at least three wells, the second light detector positioned within the same well as the second light emitter to sense whether the second light emitter is emitting light; and
   e. an intrusion alarm activated upon the detection of light by the first light detector and also activated when the second light detector does not detect light.

18. A method of detecting entry of an object into a protected space where a robotic machine moves, the method comprising the steps of:
   a. providing at least one light emitter, the light emitter emitting light which defines at least one border of the protected space;
   b. providing at least one light detector next to the at least one light emitter;
   c. allowing the object to enter the protected space by contacting the border of the protected space;
   d. detecting light that is emitted from the light emitter and reflected from the object to the at least one light detector when the object contacts the border of the protected space;
   e. causing the at least one light detector to send a signal indicating a breach of the protected space by the object; and
   f. activating an intrusion alarm to suspend movement of the robotic machine.

19. The method of claim 18 wherein at least one light emitter comprises multiple light emitters defining multiple borders of the protected space.

20. The method of claim 19 further comprising after step a., the step of selectively activating or deactivating each of the multiple light emitters which define one of the multiple borders.

21. The method of claim 18 wherein step a. further comprises situating the at least one light emitter in at least one well.

22. The method of claim 18 wherein step a. further comprises providing a voltage to the at least one light emitter such that adjustment of the voltage provided to the at least one light emitter adjusts the border of the protected space.

23. A method of detecting entry of objects into a protected space where a robotic machine operates, the method comprising the steps of:
   a. providing a first light curtain which defines a first zone within the protected space whereby activation of the first light curtain allows the first light curtain to detect an object entering the first zone;
   b. providing a second light curtain which defines a second zone within the protected space whereby activation of the second light curtain allows the second light curtain to detect the object entering the first zone;
   c. activating the first light curtain and the second light curtain when both the first zone and the second zone are to be used for operation of the robotic machine;
   d. deactivating the first light curtain and activating the second light curtain when only the second zone is to be used for operation of the robotic machine, thereby allowing the object to enter the first zone without detection by the first light curtain; and
   e. operating an intrusion alarm upon detection by the first light curtain or the second light curtain that the object has entered the protected space.

24. The method of claim 23 wherein the intrusion alarm suspends operation of the robotic machine.

25. The method of claim 23 wherein the first light curtain provided in step a. comprises at least one board having a plurality of wells with a light emitter or a light detector positioned within each of the plurality of wells.

26. The method of claim 25 wherein step a. further comprises providing a voltage to the light emitter such that adjustment of the voltage provided to the light emitter adjusts the size of the first zone.

* * * * *